United States Patent Office 2,985,613
Patented May 23, 1961

2,985,613

RESINOUS COMPOSITIONS AND OBJECTS HAVING CONTROLLED UHF CHARACTERISTICS

Joseph A. Campbell, Hermosa Beach, Calif., assignor to X-Port Oils, Inc., Los Angeles, Calif., a corporation of California No Drawing. Filed May 10, 1956, Ser. No. 583,917

8 Claims. (Cl. 260—38)

The present invention relates to a resin composition particularly adapted for use in forming strong objects reinforced with glass fibers, the resulting objects being characterized by high strength, resistance to heat, and homogeneous transmission characteristics with respect to ultra high frequency waves.

Radar domes and other structures through which ultra high frequency waves are transmitted must have uniform homogeneous characteristics to the passage of such waves and not disperse or cause uncontrolled deviation from the desired pattern or direction in which such waves are either transmitted or received through the panel, objects, radar dome or the like. Resinous compositions have very little refractive effect upon UHF waves whereas glass fibers, usually employed as a reinforcing agent in such formed objects, exhibit a pronounced refractive effect, the deviation or effect being generally measured and expressed as a loss tangent. A panel or dome made of glass fabric impregnated with a resin is not homogeneous in its transmission characteristics since in one incremental area of such dome there may be a very high proportion of glass fibers while in another incremental area of such dome there may be a very low or negligible amount of glass fibers and a very high proportion of resin.

The present invention discloses a method of imparting uniform electric, dielectric and transmission characteristics to formed objects made of resinous compositions reinforced with glass fibers. It is to be understood that such reinforcing may be in the form of cloth or fabrics, mats or loose glass fibers. The glass fibers are generally made from a borosilicate glass composition.

It has been determined that finely divided titanium dioxide produces a higher loss tangent than even glass fibers. The present invention utilizes this property and discloses a method whereby a resin composition may be balanced in its characteristics to the loss tangent characteristics of a glass fiber reinforcing and the void space in such reinforcing so as to impart homogeneous dielectric and transmission characteristics to an object formed from such resin and glass reinforcing. The invention also pertains to resin compositions for use in impregnating glass fabrics and to formed objects made therefrom, the resulting objects being characterized by their homogeneous response and transmission characteristics to ultra high frequency waves, etc. Moreover, the heat resistance and strength of such objects is greatly enhanced.

It is an object of the present invention, therefore, to disclose and provide a method of producing resinous thermosetting compositions adapted for use in the production of formed objects having enhanced characteristics with respect to transmission of ultra high frequency waves, resistance to heat, etc.

Another object of the invention is to disclose and provide a resin composition adapted for use with glass fiber reinforcings.

A further object of the invention is to disclose and provide a formed object made of a thermosetting resin reinforced with glass fibers, such object being characterized by homogeneous transmission characteristics to UHF waves.

Other objects and advantages will become apparent to those skilled in the art from the following description and examples.

The present invention is applicable for use with various thermosetting resins, such as the condensation products of reaction between formaldehyde and a phenol, with the high temperature thermosetting resins described in my copending application, Serial No. 290,087, filed May 26, 1952, now Patent No. 2,753,316, and disclosing etherized condensation products such as those obtained by condensation of an alkyl ether of phenol and an aldehyde, resins such as the various triallylcyanurates, polyester resins, etc. Epoxy type resins capable of being cured by the application of some heat may also be employed.

As previously indicated titanium dioxide exerts a definite refractive effect of high order upon UHF waves. For the purposes of the present invention it has been found that powdered titanium dioxide, composed of very finely divided particles having an average dimension of less than 0.005 inch should be used, such material being often subdivided to particles having an average dimension of only 0.00005 inch. Such finely divided titanium dioxide is preferably incorporated into and homogeneously dispersed in a thermosetting resin in syrup form. When phenolic resins of the type referred to in my copending application are employed, such phenolic resin contains between about 60% and 70% solids, the balance being composed of a vaporizable organic solvent such as acetone or alcohol and generally including a small amount of water. The water content may be as low as 2% but often comprises 6% or even 12% of the total. Phenolic resins where 60% to 85% of cross-bonding possibilities have been saturated are eminently suited for use in accordance with the present invention.

The very finely divided titanium dioxide is incorporated and dispersed in such thermosetting resin in any suitable blender, paint mill, ball mill, or the like. The temperature of the resin should not exceed about 150° F. and in most instances the blending operation can be carried out at atmospheric temperatures. In some instances it has been found desirable to conduct the blending under a blanket of carbon dioxide gas.

Upon being blended, the product may be diluted, if desired, with an additional quantity of vaporizable organic solvent. Whether additional solvent is added or not depends somewhat upon the forming methods used in making the finished object. It is to be understood that the finished object, whether it is a radar dome, panel, housing, or the like, may be made in any customary manner as, for example, by impregnation of a fabric followed by subjecting the fabric to heat and pressure, by layering and spraying followed by the application of pressure and curing, or the like.

In all instances, the quantity of titanium dioxide blended with the thermosetting resin is such that the quantity of resin and titanium dioxide embodied in the finished article is balanced against the quantity of glass fibers contained in the article so as to produce homogeneity in the transmission characteristics of the finished article. When the glass fiber reinforcing is made of the usual borosilicate glass composition, the resin preferably contains between about 34% and 38% on a solvent-free basis of finely-divided titanium dioxide in homogeneous dispersion. When such resin is then used in producing the formed, cured, reinforced object, such object will be found to comprise approximately 50% glass fibers, approximately 32% of resin, and 18% of titanium dioxide. It is to be understood that some variation may be necessary from these specific proportions, depending upon the inherent refractive characteristics of the fabric or glass fibers used, The finished object made in accordance with the present invention has unexpectedly uniform transmission characteristics to ultra high frequency waves and extremely high resistance to high temperatures, the objects retaining their flexural and sheer strength at temperatures in excess of 600° F. The loss tangent is stabilized and therefore any possibility of change of phase relationships is eliminated. It may be noted that the best results are obtained with reinforcing fibers made of borosilicate glass containing less than 1% alkalies as $Na_2O$ and $K_2O$. The finished object made in accordance with the present invention is transparent to the passage of electrical energy from an antenna as well as energy reflected back from a target into the antenna; it minimizes the effect due to distortion of the beam pattern and absorption of the beam energy; it has negligible moisture absorption and reflection effect upon the emitted or received beam.

I claim:

1. A resin composition for impregnating glass fabric which upon curing exhibits substantially the same loss tangent to UHF waves as the said glass fabric whereby the impregnated glass fabric is characterized by its homogeneous transmission of UHF waves, by its high strength and by its high resistance to heat, said resin composition consisting essentially of a thermosetting resin containing finely divided titanium dioxide in homogeneous dispersion, said titanium dioxde concentration being between about 34% and 38% on a solvent free basis and the particles of titanium dioxide having an average dimension of less than 0.005 inch.

2. A resin composition for impregnating glass fabric made of borosilicate glass which upon curing exhibits substantially the same loss tangent to UHF waves as the said borosilicate glass fabric whereby the impregnated borosilicate glass fabric is characterized by its homogeneous transmission of UHF waves, by its high strength and by its high resistance to heat, said resin composition consisting essentially of the thermosetting, syrup-form, condensation products of a phenol and an aldehyde containing finely divided titanium dioxide in homogeneous dispersion, said titanium dioxide concentration being between about 34% and 38% on a solvent free basis and the particles of titanium dioxide having an average dimension of less than 0.005 inch.

3. A resin composition as stated in claim 2, the resin being a condensation product of a phenol and formaldehyde.

4. A resin composition as stated in claim 2, the thermosetting resin being a condensation product of an alkyl ether of phenol and an aldehyde.

5. A resin composition as stated in claim 2 wherein the thermosetting resin is a triallylcyanurate.

6. A formed object as stated in claim 3, the thermosetting resin being condensation products of a phenol and formaldehyde.

7. A formed object made of a thermosetting resin reinforced with glass fiber, said resin containing finely divided titanium dioxide in homogeneous dispersion so that it exhibits substantially the same loss tangent to UHF waves as the said glass fiber whereby the said formed object is characterized by homogeneous transmission of UHF waves, by high strength and by high resistance to heat, said formed object consisting essentially of between 48% and 52% of glass fiber, 30% to 34% of thermosetting resin consisting of condensation products of a phenol and an aldehyde and 16% to 20% of finely divided titanium dioxide homogeneously dispersed in the resin, the particles of titanium dioxide being smaller than 0.005 inch in average dimension.

8. A formed object as stated in claim 7, wherein the thermosetting resin is a triallylcyanurate.

References Cited in the file of this patent

UNITED STATES PATENTS

| | | |
|---|---|---|
| 2,539,438 | Kropa et al. | Jan. 30, 1951 |
| 2,714,098 | Martin | July 26, 1955 |
| 2,816,084 | Nowacki | Dec. 10, 1957 |

FOREIGN PATENTS

| | | |
|---|---|---|
| 732,257 | Great Britain | June 22, 1955 |